(12) United States Patent
O'Neill (10) Patent No.: US 11,197,300 B1
(45) Date of Patent: Dec. 7, 2021

(54) MITIGATING INTERFERENCE CAUSED BY EXTERNAL NETWORKS

(71) Applicant: Sprint Spectrum LP, Overland Park, KS (US)

(72) Inventor: William O'Neill, New Paltz, NY (US)

(73) Assignee: T-Mobile Innovations LLC, Overland Park, KS (US)

( * ) Notice: Subject to any disclaimer, the term of this patent is extended or adjusted under 35 U.S.C. 154(b) by 121 days.

(21) Appl. No.: 16/523,199

(22) Filed: Jul. 26, 2019

(51) Int. Cl.
*H04W 72/08* (2009.01)
*H04L 5/00* (2006.01)
*H04W 72/12* (2009.01)

(52) U.S. Cl.
CPC ......... *H04W 72/082* (2013.01); *H04L 5/0057* (2013.01); *H04W 72/1226* (2013.01)

(58) Field of Classification Search
CPC ............ H04W 72/082; H04W 72/1226; H04L 5/0057
See application file for complete search history.

(56) References Cited

U.S. PATENT DOCUMENTS

2015/0156782 A1 * 6/2015 Manssour ............ H04J 11/0059
455/452.1

FOREIGN PATENT DOCUMENTS

WO    WO-2012062152 A1 *  5/2012  ........... H04L 5/0032

* cited by examiner

*Primary Examiner* — Siming Liu (57) ABSTRACT

Mitigating interference caused by external networks includes identifying air interface resources within a wireless air interface that are subject to interference from the external network, scheduling resources for a first one or more wireless devices reporting channel conditions that meet a threshold or being a threshold distance from a serving access node to avoid using the identified air interface resources, and instructing a second one or more wireless devices reporting channel conditions that do not meet the threshold or within a threshold distance from the serving access node to use the identified air interface resources.

18 Claims, 5 Drawing Sheets

MITIGATING INTERFERENCE CAUSED BY EXTERNAL NETWORKS

TECHNICAL BACKGROUND

A heterogeneous network can be configured to include various types of access nodes that are configured to deploy wireless air interfaces of different types, such as 4G long-term evolution (LTE), 5G new radio (NR), and so on. Further, these different wireless air interfaces or sectors may be configured to utilize different frequency bands, such as 20 MHz bandwidths around 1.8 GHz, 2.5 GHz, and so on. However, with the increasing proliferation of wireless networks operated by different operators/providers, there are increasing levels of interference caused by different wireless networks using the same frequencies. For example, a first sector of a first wireless network may be configured to utilize a specific frequency bandwidth, and a nearby second sector of a second wireless network (operated by a different entity) may be configured to utilize the same frequency bandwidth, or a different frequency bandwidth that contains some of the same frequencies as the first wireless network. Whereas coordination between networks of the same provider may be performed with ease, coordination between networks of different providers can be more challenging. Thus, there is a need for a provider of a first network to mitigate interference caused by a different (i.e. external) network.

OVERVIEW

Exemplary embodiments described herein include methods, systems, and processing nodes for mitigating interference caused by external networks. An exemplary method for mitigating interference includes determining that a portion of a total bandwidth associated with a first wireless network is subject to interference from an interfering source, and scheduling resources from the total bandwidth towards a first one or more wireless devices attached to one or more serving access nodes in the first network such that the first one or more wireless devices are unable to use the portion of the total bandwidth subject to the interference.

An exemplary system for mitigating interference includes a processing node and a processor coupled to the processing node. The processor may be configured to perform operations including determining an interference caused to a first portion of resources of a total bandwidth deployed in one or more sectors of a wireless network, determining that the interference caused to the first portion of resources is below a threshold, and scheduling resources from the total bandwidth towards one or more wireless devices within the one or more sectors such that the one or more wireless devices are unable to use the portion of the total bandwidth subject to the interference.

An exemplary processing node for mitigating interference is configured to perform operations including identifying air interface resources within a first wireless air interface associated with a first wireless network that are subject to interference from a second wireless air interface associated with a second wireless network, instructing a first one or more wireless devices reporting channel conditions that meet a threshold to avoid using the identified air interface resources, and instructing a second one or more wireless devices reporting channel conditions that do not meet the threshold to use the identified air interface resources.

DETAILED DESCRIPTION

The disclosed embodiments illustrate methods, systems, and processing nodes for mitigating interference caused to a sector of a wireless network by another wireless network (hereinafter, "external network"). An exemplary method for mitigating interference includes determining that a portion of a total bandwidth associated with a first wireless network is subject to interference from an interfering source, and scheduling resources from the total bandwidth towards a first one or more wireless devices attached to one or more serving access nodes in the first network such that the first one or more wireless devices are unable to use the portion of the total bandwidth subject to the interference. In exemplary embodiments described herein, the first one or more wireless devices may be operating within a wireless sector deployed by an access node. For example, the wireless sector can be deployed by a first antenna array of the access node. The access node may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antennae arranged in one or more arrays, wherein each antenna array is configured to steer or form one or more beams over a geographical region referred to herein as a "sector." Further, the sector may be configured to utilize a plurality of frequency resources (such as resource blocks) within a frequency bandwidth, or "total bandwidth."

Further, in exemplary embodiments, the method includes scheduling the resources from the total bandwidth towards the first one or more wireless devices responsive to determining that the first one or more wireless devices are greater than a threshold distance from the one or more serving access nodes to which the first one or more wireless devices are attached. In other words, if the first one or more wireless devices are far enough from a serving access node such that they are unable to utilize the resource blocks that are affected by the interference, then they may simply be instructed to avoid utilizing those resource blocks. Conversely, resources may be scheduled towards a second one or more wireless devices that are less than the threshold distance from the one or more serving access nodes such that the second one or more wireless devices are able to use the portion of the total bandwidth subject to the interference. In other words, if the second one or more wireless devices are close enough to the serving access node, they may be able to utilize the resource blocks subject to interference. To enable utilization of the interfered resource blocks by the second one or more wireless devices, the method can further include assigning a higher transmit power level or a higher-order modulation and coding scheme (MCS) towards the second one or more wireless devices. This may not be beneficial to the first one or more wireless devices that are further than the threshold distance from the serving access node, since they may not be able to utilize the higher transmit power or their quality of service may not significantly improve by using the higher-order MCS.

Alternatively or in addition, the resources from the total bandwidth are scheduled towards the first one or more wireless devices responsive to determining that the first one or more wireless devices report channel conditions that meet a threshold. In other words, if the first one or more wireless devices report poor channel conditions, such as a noise level that exceeds a threshold, or a signal level that falls below a threshold, such that they are unable to utilize the resource blocks that are affected by the interference, then they may simply be instructed to avoid utilizing those resource blocks. Conversely, resources may be scheduled towards a second one or more wireless devices that report channel conditions that do not meet the threshold such that the second one or more wireless devices are able to use the portion of the total bandwidth subject to the interference. In other words, if the second one or more wireless devices report good channel conditions, such as a noise level that is below a threshold, or a signal level that meets a threshold, such that they are able to utilize the resource blocks that are affected by the interference, then they may be instructed to utilizing those resource blocks. Similar to the previous embodiment, the second one or more wireless devices (that report good signal conditions) may be assigned a higher transmit power level or a higher-order modulation and coding scheme. In exemplary embodiments, the channel condition may include one or more channel quality indicators (CQIs). Further in exemplary embodiments, a channel condition or CQI may be associated with a distance of the wireless device from the serving access node, and the threshold for channel quality may be associated with the threshold distance.

As described herein, the interfering source can include a second (external) wireless network. For example, a coverage area of the serving access node may (or a sector deployed therefrom) can overlap with coverage of the external wireless network. The external network may be configured to utilize only a portion of the total bandwidth available for use by the serving access node. For example, the external network may be configured to transmit a video signal over a 6 MHz carrier that shares frequencies with a 20 MHz carrier utilized by (or available to be utilized by) the serving access node. Thus, the method further identifying which resources from the total bandwidth available to the serving access node are subject to the interference from the external network. Further, the method can include measuring an interference level of resources within the portion. If the interference level of resources within the portion exceeds a threshold, resources from the total bandwidth may be scheduled towards all wireless devices attached to the serving access node (or the sectors deployed therefrom) such that all the wireless devices are unable to use the portion of the total bandwidth subject to the interference. Whereas, if the interference level of the resources is measured to be below a threshold, then only certain wireless devices may be instructed to avoid using these resources. For example, as described above, the certain wireless devices instructed to avoid using these resources can include wireless devices greater than a threshold distance from the serving access node, reporting threshold channel conditions, or any combination thereof. Whereas, wireless devices closer to the serving access node or reporting good signal conditions can be instructed to utilize the resources subject to interference and to increase their transmit power and/or MCS, such that these wireless devices are able to maintain a quality of service.

Further, the method can include measuring a load level of the serving access node, or of one or more sectors deployed therefrom. If the load level does not meet or exceed a threshold, resources from the total bandwidth may be scheduled towards all wireless devices attached to the serving access node (or within the sectors deployed therefrom) such that all the wireless devices are prevented from using the portion of the total bandwidth subject to the interference. Since the load level is low, rendering the interfered resources unusable has no significant impact on quality of service. Whereas, if the load level meets (or exceeds) the threshold, then only certain wireless devices may be instructed to avoid using these resources, such that overall quality of service for the sector does not get compromised. For example, as described above, the certain wireless devices instructed to avoid using these resources can include wireless devices greater than a threshold distance from the serving access node, reporting threshold channel conditions, or any combination thereof. Whereas, wireless devices closer to the serving access node or reporting good signal conditions can be instructed to utilize the resources subject to interference and to increase their transmit power and/or MCS, such that these wireless devices are able to maintain a quality of service despite the sector having a high load.

In another exemplary embodiment, the interfering source may include a network node that is not part of an external network, such as another access node or wireless device within the same wireless network. In this case, interference coordination operations may be performed between the serving access node one or more serving access nodes within the first wireless network. In similar embodiments, a first sector deployed by a serving access node may be subject to interference from an external network, while a second sector deployed by the serving access node may be subject to interference from another network node within the same network. Therefore, the serving access node can be configured to perform the described operations for limiting usage of the affected resources by certain (or all) wireless devices within the first sector, while performing interference coordination operations with the same-network node for the affected resources in the second sector. These operations may be repeated for additional wireless sectors deployed by additional antenna arrays of the access node.

Similar operations may be performed by an exemplary system described herein and comprising at least a processing node and a processor coupled to the processing node. The processing node can be communicatively coupled to any other network node within the wireless network, such as an access node or a controller node. These and other embodiments are further described herein and with reference to FIGS. 1-6.

Figure 1:
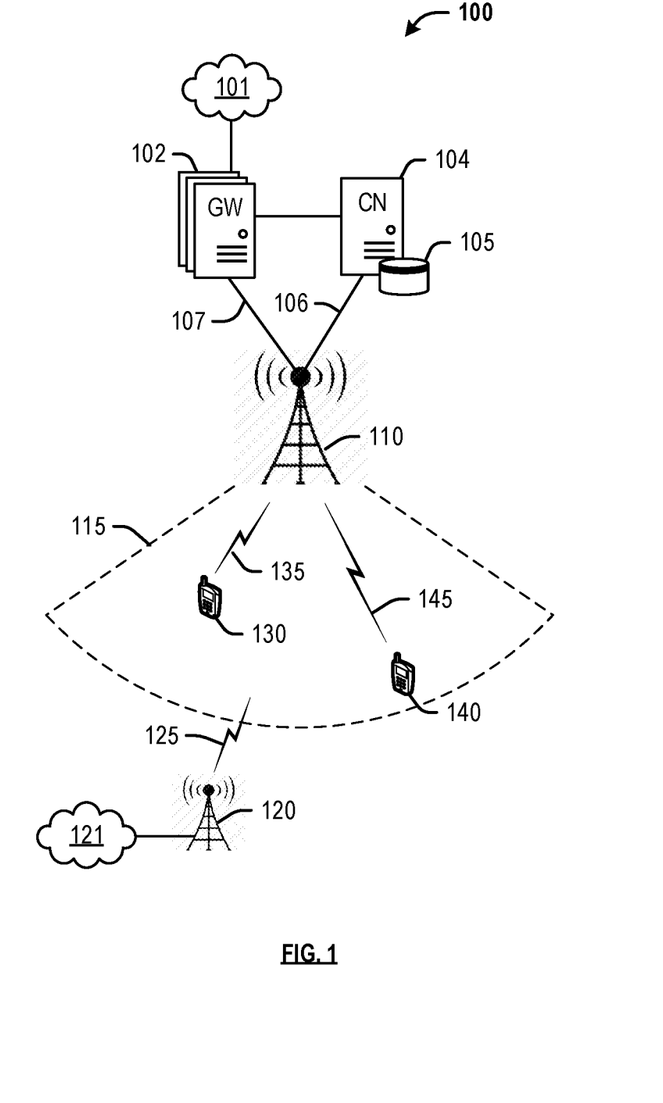
FIG. 1 illustrates an exemplary system for mitigating interference caused by external networks.

FIG. 1 depicts an exemplary system 100 for mitigating interference. System 100 comprises a communication network 101, gateway 102, controller node 104, access node 110, and wireless devices 130, 140. Access node may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antennae arranged in one or more arrays, wherein each antenna array is configured to steer or form one or more beams over a geographical region 115, referred to herein as a sector 115. Wireless devices 130 and 140 are located within sector 115 and access network services from access node 110. Access node 110 communicates with wireless devices 130, 140 over corresponding wireless communication links 135, 145, which can include direct communication links, formed beams, multiple-input-multiple-output (MIMO), and so on.

Further illustrated herein is a second access node 120 associated with a second network 121. In an exemplary embodiment, network 121 may be referred to as an "external network" since it is not part of nor operated by an operator of network 101. Further as illustrated herein, a signal 125 associated with access node 120 may cause an interference within wireless sector 115. For example, signal 125 may utilize frequencies that are common to frequencies utilized within sector 115, thereby causing interference to resource blocks that may have been allocated for transmissions to and from wireless devices 130, 140. The resource blocks subject to interference may comprise a portion of a total amount of resources available for use by wireless devices 130, 140 within sector 115. In other words, access node 120 may be transmitting using a portion of the total bandwidth available for use within sector 115. For example, access node 120 may be configured to transmit a video signal over a 6 MHz carrier that shares frequencies with a 20 MHz carrier utilized by (or available to be utilized by) the serving access node 110.

Thus, as described herein, a processing node communicatively coupled to any network node within system 100 (such as, for example, access node 110 or controller node 104) can be configured to mitigate the interference by determining that a portion of a total bandwidth available for use within sector 115 is subject to interference from an interfering source (i.e. access node 120), identifying the resources subject to interference (i.e. "interfered resources"), and scheduling resources from the total bandwidth towards wireless devices 130 and/or 140 such that the wireless devices 130 and/or 140 are unable to (or instructed not to) use the interfered resources. For example, the resources from the total bandwidth may be scheduled for wireless device 140 responsive to determining that wireless device 140 is greater than a threshold distance from serving access node 110. In other words, if wireless device 140 is far enough from serving access node 110 such that it is unable to utilize the resource blocks that are affected by the interference, then it may simply be instructed to avoid utilizing those resource blocks. Conversely, resources may be scheduled towards wireless device 130 that is less than the threshold distance from the serving access node 110 such that the wireless device 130 is able to use the portion of the total bandwidth subject to the interference. In other words, if the wireless device 130 is close enough to the serving access node 110, it may be able to utilize the resource blocks subject to interference. To enable utilization of the interfered resource blocks by wireless device 130, the method can further include assigning a higher transmit power level or a higher-order modulation and coding scheme (MCS) towards wireless device 130. This may not be beneficial to the wireless device 140 that is further than the threshold distance from the serving access node 110, since wireless device 140 may not be able to utilize the higher transmit power or the quality of service may not significantly improve by using the higher-order MCS.

Further, a channel condition reported from each of wireless devices 130, 140 may be determined prior to scheduling resources to wireless devices 130, 140. For example, if the wireless device 140 reports poor channel conditions, such as a noise level that exceeds a threshold, or a signal level that falls below a threshold, then it may simply be instructed to avoid utilizing the interfered resource blocks. Conversely, wireless device 130 may report channel conditions that do not meet the threshold such that wireless device 130 is able to use the portion of the total bandwidth subject to the interference. In other words, if wireless device 130 reports good channel conditions, such as a noise level that is below a threshold, or a signal level that meets a threshold, then wireless device 130 may be instructed to utilizing those resource blocks. Further, wireless device 130 can be assigned a higher transmit power level or a higher-order modulation and coding scheme. In exemplary embodiments, the channel condition may include one or more channel quality indicators (CQIs). Thus, a channel condition or CQI may be associated with a distance of the wireless devices 130, 140 from the serving access node 110, and the threshold for channel quality may be associated with the threshold distance.

Further, the method can include measuring an interference level of the interfered resources. If the interference level of the interfered resources exceeds a threshold, resources from the total bandwidth may be scheduled towards all wireless devices within sector 115 (including both wireless devices 130 and 140) such that all the wireless devices are unable to use (or prevented from using) the interfered resources. Whereas, if the interference level of the interfered resources is measured to be below a threshold, then only certain wireless devices may be instructed to avoid using these resources. For example, as described above, the certain wireless devices instructed to avoid using these resources can include wireless device 140 that is a threshold distance from the serving access node 110, reporting threshold channel conditions, or any combination thereof. Whereas, wireless device 130 that is closer to the serving access node or reporting good signal conditions can be instructed to utilize the resources subject to interference and to increase its transmit power and/or MCS.

Alternatively or in addition, a load level of the serving access node 110 (or of sector 115) can be measured and, if the load level does not meet or exceed a threshold, resources from the total bandwidth may be scheduled towards all wireless devices 130, 140 such that all the wireless devices 130, 140 are prevented from using the portion of the total bandwidth subject to the interference. Since the load level is low, rendering the interfered resources unusable has no significant impact on quality of service. Whereas, if the load level meets (or exceeds) the threshold, then only certain wireless devices may be instructed to avoid using these resources, such that overall quality of service for the sector does not get compromised. For example, as described above, the certain wireless devices instructed to avoid using these resources can include wireless device 140 that is a threshold distance from the serving access node 110, reporting threshold channel conditions, or any combination thereof. Whereas, wireless device 130 that is closer to the serving access node or reporting good signal conditions can be instructed to utilize the resources subject to interference and to increase its transmit power and/or MCS to maintain quality of service despite the sector 115 having a high load.

In another exemplary embodiment, the interfering source may include a network node that is not part of external network 121, such as another access node or wireless device within the same wireless network (not shown). In this case, interference coordination operations may be performed between the serving access node and the interfering source within the same network. In an exemplary embodiment, while wireless sector 115 is subject to interference from access node 120 such that the above-described scheduling operations are performed for wireless devices 130, 140, a second sector (not shown herein) deployed by the serving access node 110 may be subject to interference from another network node within the same network, and interference coordination operations may be performed with the same-network node for the affected resources in the second sector.

Access node 110 can be any network node configured to provide communication between wireless devices 130, 140 and communication network 101, including standard access nodes and/or short range, low power, small access nodes. For instance, access node 110 may include any standard access node, such as a macrocell access node, base transceiver station, a radio base station, next generation or gigabit NodeBs (gNBs) in 5G networks, or enhanced eNodeBs (eNBs) in 4G/LTE networks, or the like. In an exemplary embodiment, a macrocell access node can have a coverage area 115 in the range of approximately five kilometers to thirty five kilometers and an output power in the tens of watts. In other embodiments, access node 110 can be a small access node including a microcell access node, a picocell access node, a femtocell access node, or the like such as a home NodeB or a home eNodeB device. Moreover, it is noted that while access nodes 110, 120 are illustrated in FIG. 1, any number of access nodes can be implemented within system 100.

Access node 110 can comprise processors and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicate with gateway node 102 and controller node 104 via communication links 106, 107. Access node 110 may communicate with other access nodes (not shown) using a direct link such as an X2 link or similar.

Wireless devices 130, 140 may be any device, system, combination of devices, or other such communication platform capable of communicating wirelessly with access node 110 using one or more frequency bands deployed therefrom. Wireless devices 130, 140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 130, 140. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as interference levels and load information for sector 115 (and other sectors within system 100), distances and channel conditions of wireless devices 130, 140, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
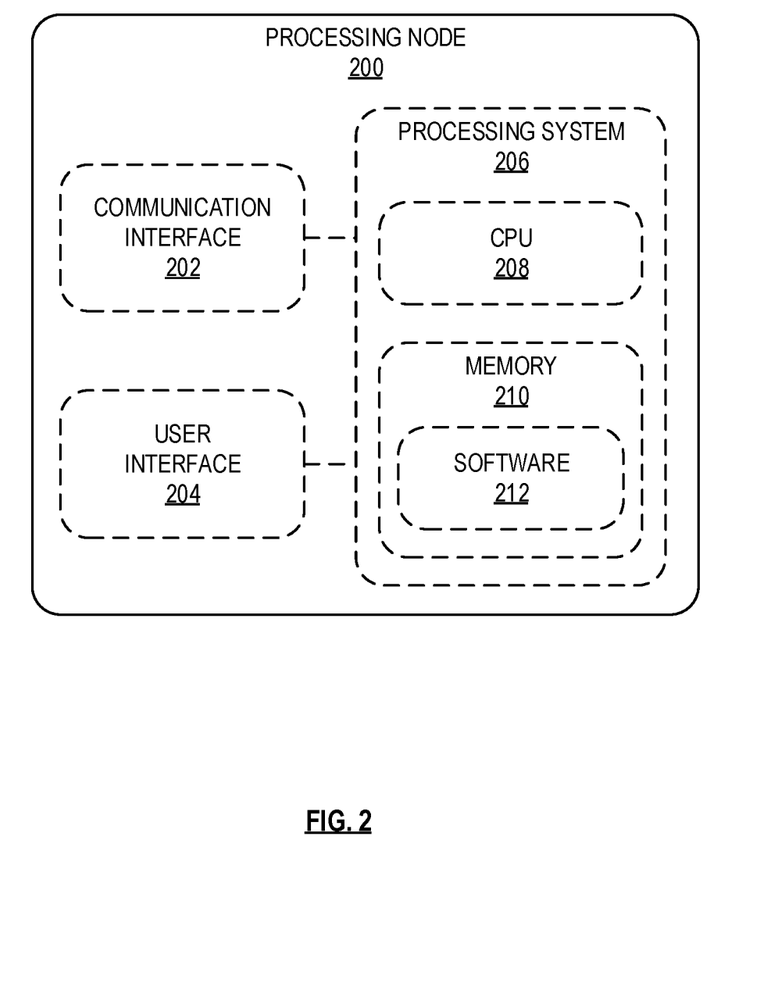
FIG. 2 illustrates an exemplary processing node for mitigating interference caused by external networks.

FIG. 2 depicts an exemplary processing node 200 for selecting a subcarrier spacing in a wireless network. Processing node comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software.

Further, memory 210 can store software 212, which may be executed to perform the operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 212 includes instructions that enable processing node 200 to perform operations including determining that a portion of a total bandwidth associated with a first wireless network is subject to interference from an interfering source, and scheduling resources from the total bandwidth towards a first one or more wireless devices attached to one or more serving access nodes in the first network such that the first one or more wireless devices are unable to use the portion of the total bandwidth subject to the interference. In another exemplary embodiment, software 212 includes instructions that enable processing node 200 to perform operations including determining an interference caused to a first portion of resources of a total bandwidth deployed in one or more sectors of a wireless network, determining that the interference caused to the first portion of resources is below a threshold, and scheduling resources from the total bandwidth towards one or more wireless devices within the one or more sectors such that the one or more wireless devices are unable to use the portion of the total bandwidth subject to the interference. In yet another exemplary embodiment, software 212 includes instructions that enable processing node 200 to perform operations including identifying air interface resources within a first wireless air interface associated with a first wireless network that are subject to interference from a second wireless air interface associated with a second wireless network, instructing a first one or more wireless devices reporting channel conditions that meet a threshold to avoid using the identified air interface resources, and instructing a second one or more wireless devices reporting channel conditions that do not meet the threshold to use the identified air interface resources.

Figure 3:
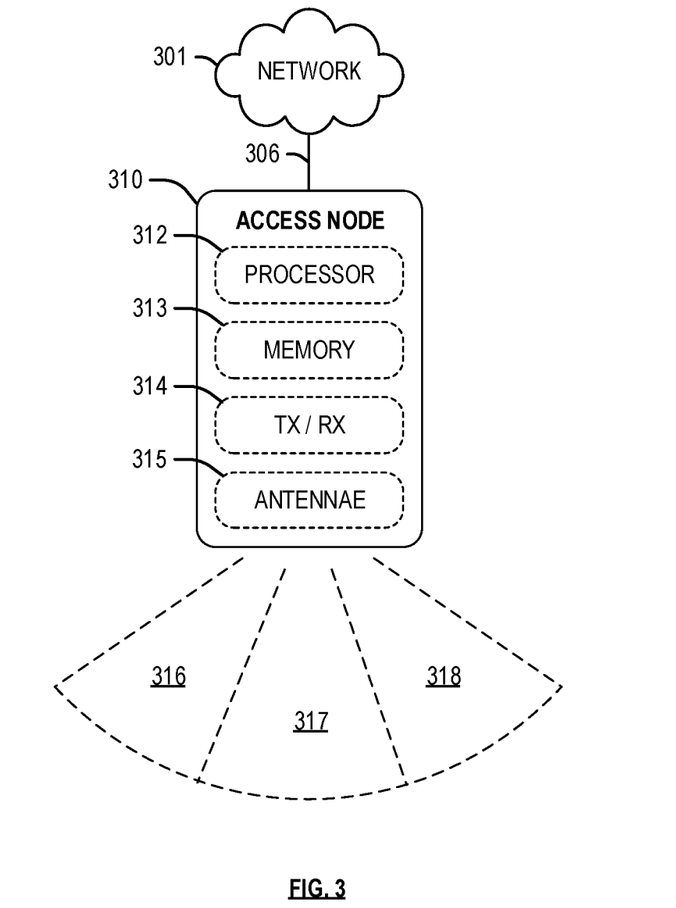
FIG. 3 illustrates an exemplary access node for mitigating interference caused by external networks.

FIG. 3 depicts an exemplary access node 310 for selecting a subcarrier spacing in a wireless network. Access node 310 may be configured as an access point for providing network services from network 301 to end-user wireless devices via a radio-air interface deployed therefrom. Access node 310 is illustrated as comprising a processor 312, a memory 313 (for storing instructions that are performed by processor 312), a transceiver 314, and antennae 315 for deploying a radio air interface over wireless sectors 316, 317, and 318. One pair of transceivers and antennae are illustrated herein solely to simplify the written description, and it may be evident to those having ordinary skill in the art, that any combination of transceivers and antennae may be incorporated in order to deploy different sectors that are configured to utilize different frequency bands, as well as formed beams, MU-MIMO data streams, and/or to facilitate communication with other network nodes on network 301. Further, access node 310 is communicatively coupled to network 301 via communication interface 306, which may be any wired or wireless link as described above.

In an exemplary embodiment, memory 313 includes instructions that enable access node 310 to perform operations including determining that a portion of a total bandwidth available for use within one or more of sectors 316, 317, 318 is subject to interference from an interfering source, and scheduling resources from the total bandwidth towards a first one or more wireless devices within the one or more sectors 316, 317, 318 such that the first one or more wireless devices are unable to use the portion of the total bandwidth subject to the interference. In another exemplary embodiment, memory 313 includes instructions for determining an interference caused to a first portion of resources of a total bandwidth deployed in one or more sectors 316, 317, 318, determining that the interference caused to the first portion of resources is below a threshold, and scheduling resources from the total bandwidth towards one or more wireless devices within the one or more sectors 316, 317, 318 such that the one or more wireless devices are unable to use the portion of the total bandwidth subject to the interference. In yet another exemplary embodiment, memory 313 includes instructions for identifying air interface resources within a first wireless air interface associated with one or more sectors 316, 317, 318 that are subject to interference from a second wireless air interface associated with an external network, instructing a first one or more wireless devices reporting channel conditions that meet a threshold to avoid using the identified air interface resources, and instructing a second one or more wireless devices reporting channel conditions that do not meet the threshold to use the identified air interface resources.

Figure 4:
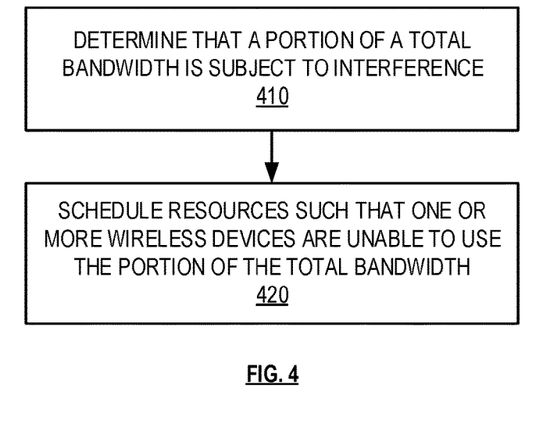
FIG. 4 illustrates an exemplary method for mitigating interference caused by external networks.

FIG. 4 illustrates an exemplary method for mitigating interference caused by external networks. The method will be discussed with reference to the exemplary communication system 100 illustrated in FIG. 1. However, the method can be implemented with any suitable communication system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 410, a portion of a total bandwidth is determined to be subject to interference. For example, one or more wireless devices may be operating within a wireless sector deployed by an access node. The wireless sector can be deployed by a first antenna array of the access node. The access node may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antennae arranged in one or more arrays, wherein each antenna array is configured to steer or form one or more beams over a geographical region referred to herein as a "sector." Further, the sector may be configured to utilize a plurality of frequency resources (such as resource blocks) within a frequency bandwidth, or "total bandwidth." Further, the interference can be caused by a second (external) wireless network. For example, a coverage area of the serving access node may (or a sector deployed therefrom) can overlap with coverage of the external wireless network. The external network may be configured to utilize only a portion of the total bandwidth available for use by the serving access node. For example, the external network may be configured to transmit a video signal over a 6 MHz carrier that shares frequencies with a 20 MHz carrier utilized by (or available to be utilized by) the serving access node. Thus, the method at 410 further includes identifying which resources from the total bandwidth available to the serving access node are subject to the interference from the external network.

At 420, resources are scheduled to wireless devices such that one or more wireless devices are unable to use (or prevented from using) resources within the portion of the total bandwidth. The resources from the total bandwidth can be scheduled towards a first one or more wireless devices responsive to determining that the first one or more wireless devices are greater than a threshold distance from the one or more serving access nodes to which the first one or more wireless devices are attached. In other words, if the first one or more wireless devices are far enough from a serving access node such that they are unable to utilize the resource blocks that are affected by the interference, then they may simply be instructed to avoid utilizing those resource blocks. Conversely, resources may be scheduled towards a second one or more wireless devices that are less than the threshold distance from the one or more serving access nodes such that the second one or more wireless devices are able to use the portion of the total bandwidth subject to the interference. In other words, if the second one or more wireless devices are close enough to the serving access node, they may be able to utilize the resource blocks subject to interference. To enable utilization of the interfered resource blocks by the second one or more wireless devices, the method can further include assigning a higher transmit power level or a higher-order modulation and coding scheme (MCS) towards the second one or more wireless devices. This may not be beneficial to the first one or more wireless devices that are further than the threshold distance from the serving access node, since they may not be able to utilize the higher transmit power or their quality of service may not significantly improve by using the higher-order MCS.

Alternatively or in addition, at 420, the resources from the total bandwidth are scheduled towards the first one or more wireless devices responsive to determining that the first one or more wireless devices report channel conditions that meet a threshold. In other words, if the first one or more wireless devices report poor channel conditions, such as a noise level that exceeds a threshold, or a signal level that falls below a threshold, such that they are unable to utilize the resource blocks that are affected by the interference, then they may simply be instructed to avoid utilizing those resource blocks. Conversely, resources may be scheduled towards a second one or more wireless devices that report channel conditions that do not meet the threshold such that the second one or more wireless devices are able to use the portion of the total bandwidth subject to the interference. In other words, if the second one or more wireless devices report good channel conditions, such as a noise level that is below a threshold, or a signal level that meets a threshold, such that they are able to utilize the resource blocks that are affected by the interference, then they may be instructed to utilizing those resource blocks. Similar to the previous embodiment, the second one or more wireless devices (that report good signal conditions) may be assigned a higher transmit power level or a higher-order modulation and coding scheme. In exemplary embodiments, the channel condition may include one or more channel quality indicators (CQIs). Further in exemplary embodiments, a channel condition or CQI may be associated with a distance of the wireless device from the serving access node, and the threshold for channel quality may be associated with the threshold distance.

Figure 5:
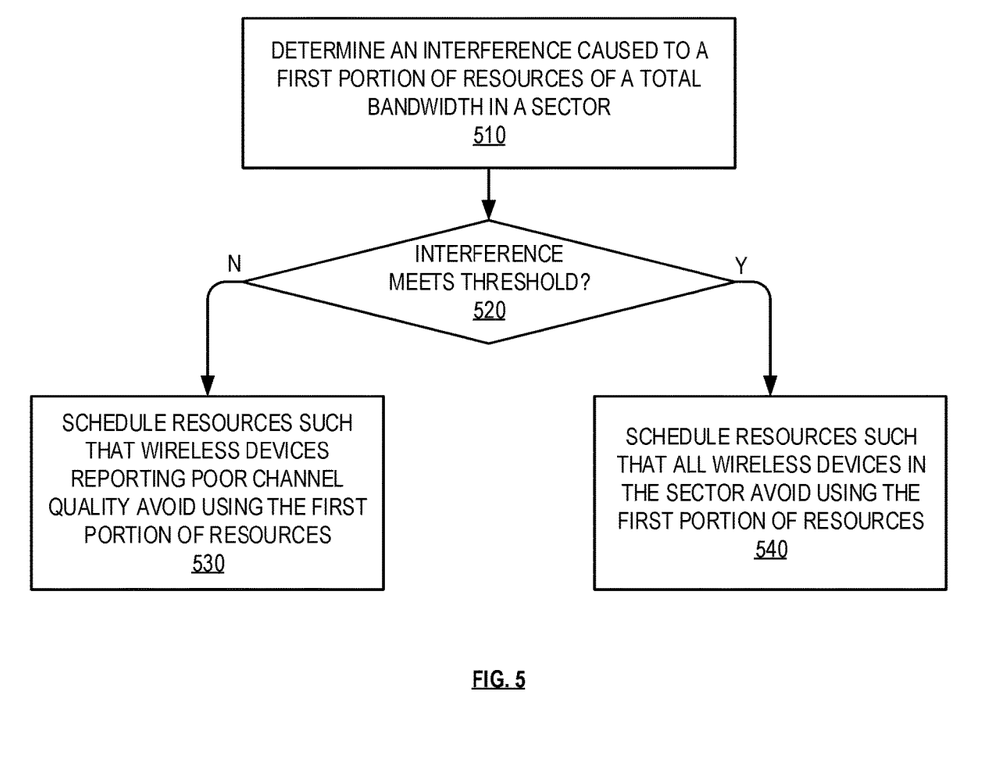
FIG. 5 illustrates another exemplary method for mitigating interference caused by external networks.

FIG. 5 illustrates another exemplary method for mitigating interference caused by external networks. The method will be discussed with reference to the exemplary communication system 100 illustrated in FIG. 1. However, the method can be implemented with any suitable communication system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 510, it is determined that an interference is caused to a first portion of resources of a total bandwidth of a sector. For example, one or more wireless devices may be operating within a wireless sector deployed by an access node. The wireless sector can be deployed by a first antenna array of the access node. The access node may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antennae arranged in one or more arrays, wherein each antenna array is configured to steer or form one or more beams over a geographical region referred to herein as a "sector." Further, the sector may be configured to utilize a plurality of frequency resources (such as resource blocks) within a frequency bandwidth, or "total bandwidth." Further, the interference can be caused by a second (external) wireless network. For example, a coverage area of the serving access node may (or a sector deployed therefrom) can overlap with coverage of the external wireless network. The external network may be configured to utilize only a portion of the total bandwidth available for use by the serving access node. For example, the external network may be configured to transmit a video signal over a 6 MHz carrier that shares frequencies with a 20 MHz carrier utilized by (or available to be utilized by) the serving access node. Thus, the method at 510 further includes identifying which resources from the total bandwidth available to the serving access node are subject to the interference from the external network.

At 520, the interference level of resources within the portion is compared to a threshold. If the interference level of resources within the portion exceeds a threshold, then at 540, resources from the total bandwidth may be scheduled towards all wireless devices attached to the serving access node (or the sectors deployed therefrom) such that all the wireless devices are unable to use the portion of the total bandwidth subject to the interference. Whereas, if the interference level of the resources is measured to be below a threshold, then at 530, only certain wireless devices may be instructed to avoid using these resources. For example, as described above, the certain wireless devices instructed to avoid using these resources can include wireless devices greater than a threshold distance from the serving access node, reporting threshold channel conditions, or any combination thereof. Whereas, wireless devices closer to the serving access node or reporting good signal conditions can be instructed to utilize the resources subject to interference and to increase their transmit power and/or MCS, such that these wireless devices are able to maintain a quality of service.

Figure 6:
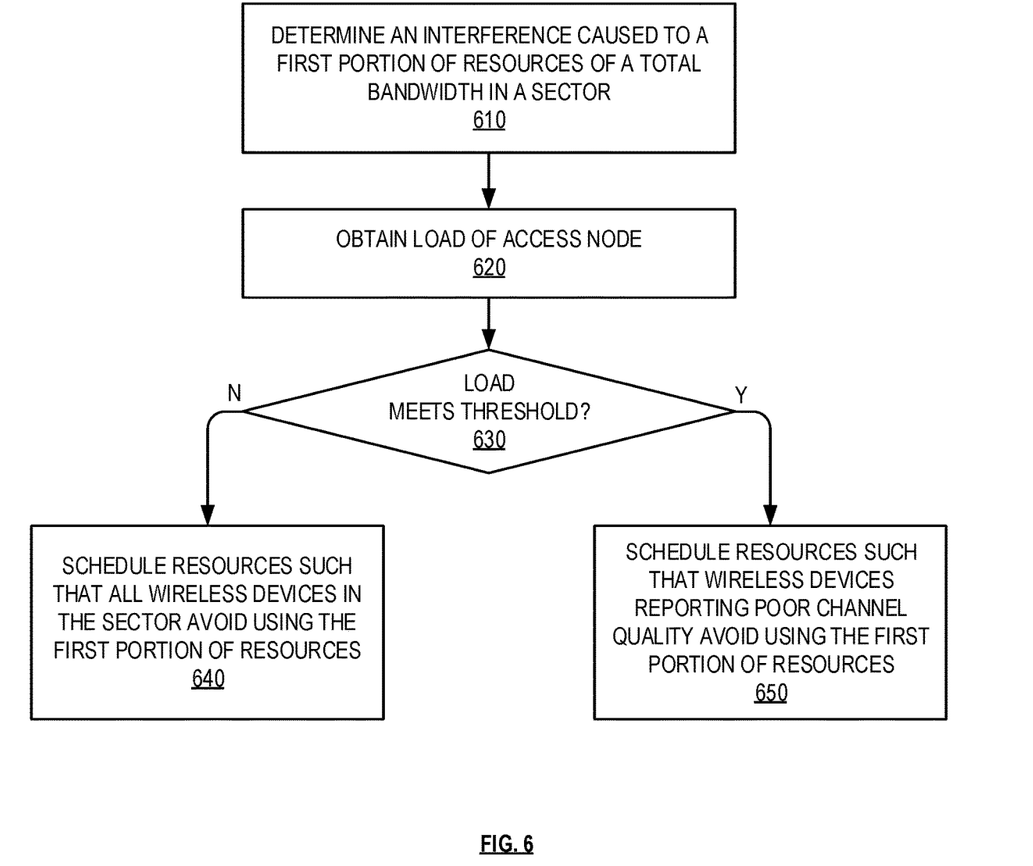
FIG. 6 illustrates another exemplary method for mitigating interference caused by external networks.

FIG. 6 illustrates another exemplary method for mitigating interference caused by external networks. The method will be discussed with reference to the exemplary communication system 100 illustrated in FIG. 1. However, the method can be implemented with any suitable communication system. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 610, it is determined that an interference is caused to a first portion of resources of a total bandwidth of a sector. For example, one or more wireless devices may be operating within a wireless sector deployed by an access node. The wireless sector can be deployed by a first antenna array of the access node. The access node may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antennae arranged in one or more arrays, wherein each antenna array is configured to steer or form one or more beams over a geographical region referred to herein as a "sector." Further, the sector may be configured to utilize a plurality of frequency resources (such as resource blocks) within a frequency bandwidth, or "total bandwidth." Further, the interference can be caused by a second (external) wireless network. For example, a coverage area of the serving access node may (or a sector deployed therefrom) can overlap with coverage of the external wireless network. The external network may be configured to utilize only a portion of the total bandwidth available for use by the serving access node. For example, the external network may be configured to transmit a video signal over a 6 MHz carrier that shares frequencies with a 20 MHz carrier utilized by (or available to be utilized by) the serving access node. Thus, the method at 610 further includes identifying which resources from the total bandwidth available to the serving access node are subject to the interference from the external network.

At 620, a load level of the serving access node (or of one or more sectors deployed therefrom) is obtained and, at 630, the load level is compared to a threshold. If the load level does not meet or exceed a threshold, then at 640, resources from the total bandwidth may be scheduled towards all wireless devices attached to the serving access node (or within the sectors deployed therefrom) such that all the wireless devices are prevented from using the portion of the total bandwidth subject to the interference. Since the load level is low, rendering the interfered resources unusable has no significant impact on quality of service. Whereas, if the load level meets (or exceeds) the threshold, then at 650, only certain wireless devices may be instructed to avoid using these resources, such that overall quality of service for the sector does not get compromised. For example, as described above, the certain wireless devices instructed to avoid using these resources can include wireless devices greater than a threshold distance from the serving access node, reporting threshold channel conditions, or any combination thereof. Whereas, wireless devices closer to the serving access node or reporting good signal conditions can be instructed to utilize the resources subject to interference and to increase their transmit power and/or MCS, such that these wireless devices are able to maintain a quality of service despite the sector having a high load.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the disclosure. The following claims specify the scope of the disclosure. Note that some aspects of the best mode may not fall within the scope of the disclosure as specified by the claims. Those skilled in the art will appreciate that the features described above can be combined in various ways to form multiple variations of the disclosure. As a result, the disclosure is not limited to the specific embodiments described above, but only by the following claims and their equivalents.

What is claimed is:

1. A method for mitigating interference, the method comprising:
   determining that a portion of a total bandwidth associated with a first wireless network is subject to interference from an interfering source; and
   scheduling resources from the total bandwidth towards a first one or more wireless devices attached to one or more serving access nodes in the first wireless network such that the first one or more wireless devices are unable to use the portion of the total bandwidth subject to the interference,
   wherein determining that the portion of the total bandwidth associated with the first wireless network is subject to the interference further comprises determining that one or more sectors deployed with the one or more serving access nodes are subject to the interference, and
   wherein the one or more wireless devices are within the one or more sectors.

2. The method of claim 1, further comprising scheduling the resources from the total bandwidth towards the first one or more wireless devices responsive to determining that the first one or more wireless devices are greater than a threshold distance from the one or more serving access nodes to which the first one or more wireless devices are attached.

3. The method of claim 2, further comprising scheduling the resources from the total bandwidth towards a second one or more wireless devices that are less than the threshold distance from the one or more serving access nodes such that the second one or more wireless devices are able to use the portion of the total bandwidth subject to the interference.

4. The method of claim 3, further comprising assigning one or more of a higher transmit power level or a higher-order modulation and coding scheme towards the second one or more wireless devices.

5. The method of claim 1, further comprising scheduling the resources from the total bandwidth towards the first one or more wireless devices responsive to determining that the first one or more wireless devices report channel conditions that meet a threshold.

6. The method of claim 5, further comprising scheduling the resources from the total bandwidth towards a second one or more wireless devices that report channel conditions that do not meet the threshold such that the second one or more wireless devices are able to use the portion of the total bandwidth subject to the interference.

7. The method of claim 6, further comprising assigning one or more of a higher transmit power level or a higher-order modulation and coding scheme towards the second one or more wireless devices.

8. The method of claim 5, wherein the channel conditions comprise a channel quality indicator (CQI).

9. The method of claim 1, wherein the interfering source comprises a second wireless network, the method further comprising measuring an interference level of resources within the portion.

10. The method of claim 1, further comprising determining that the interference level of resources within the portion exceeds a threshold; and scheduling resources from the total bandwidth towards all wireless devices within the one or more sectors such that all the wireless devices are unable to use the portion of the total bandwidth subject to the interference.

11. The method of claim 10, further comprising performing interference coordination between the one or more serving access nodes within the first wireless network.

12. A system for mitigating interference, the system comprising:
   a processing node; and
   a processor coupled to the processing node, the processor being configured to perform operations comprising:
      determining an interference caused to a first portion of resources of a total bandwidth deployed in one or more sectors of a wireless network;
      determining that the interference caused to the first portion of resources is below a threshold; and
      scheduling resources from the total bandwidth towards one or more wireless devices within the one or more sectors such that the one or more wireless devices are unable to use the portion of the total bandwidth subject to the interference.

13. The system of claim 12, wherein the operations further comprise scheduling the resources from the total bandwidth towards the one or more wireless devices responsive to determining that the one or more wireless devices are greater than a threshold distance away from one or more serving access nodes to which the one or more wireless devices are attached.

14. The system of claim 12, wherein the operations further comprise scheduling the resources from the total bandwidth towards the one or more wireless devices responsive to determining that the one or more wireless devices report channel conditions that are worse than a threshold.

15. The system of claim 12, wherein the operations further comprise determining that the interference exceeds the threshold; and scheduling resources from the total bandwidth towards all wireless devices within the one or more sectors such that all the wireless devices are unable to use the portion of the total bandwidth subject to the interference.

16. The system of claim 12, wherein the operations further comprise determining that a load level of the one or more sectors is below a threshold; and scheduling resources from the total bandwidth towards all wireless devices within the one or more sectors such that all the wireless devices are unable to use the portion of the total bandwidth subject to the interference.

17. A processing node for mitigating interference, the processing node comprising a processor that enables the processing node to perform operations comprising:
   identifying air interface resources within a first wireless air interface associated with a first wireless network that are subject to interference from a second wireless air interface associated with a second wireless network;

instructing a first one or more wireless devices reporting channel conditions that meet a threshold to avoid using the identified air interface resources; and instructing a second one or more wireless devices reporting channel conditions that do not meet the threshold to use the identified air interface resources, wherein the first wireless air interface is deployed within a wireless sector of an access node within the first wireless network, and the first and second one or more wireless devices are located within the wireless sector.

18. The processing node of claim 17, further comprising determining that a load of the sector is below a threshold; and instructing the first and second one or more wireless devices to avoid using the identified air interface resources.

* * * * *